US012659717B2

(12) United States Patent
Homorodi et al.

(10) Patent No.: US 12,659,717 B2
(45) Date of Patent: Jun. 16, 2026

(54) SUBSCRIBER IDENTITY MODULE OVER-THE-AIR PUSH NOTIFICATION

(71) Applicant: T-Mobile Innovations LLC, Overland Park, KS (US)

(72) Inventors: Zoltan Homorodi, North Bend, WA (US); Nilesh Ranjan, Sammamish, WA (US); Kyeong Hun An, Sammamish, WA (US); Hamza Hydri Syed, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 491 days.

(21) Appl. No.: 18/295,771

(22) Filed: Apr. 4, 2023

(65) Prior Publication Data

US 2024/0340631 A1 Oct. 10, 2024

(51) Int. Cl.
| | |
|---|---|
| *H04W 8/18* | (2009.01) |
| *H04W 4/14* | (2009.01) |
| *H04W 12/037* | (2021.01) |

(52) U.S. Cl.
CPC ......... *H04W 8/183* (2013.01); *H04W 12/037* (2021.01); *H04W 4/14* (2013.01)

(58) Field of Classification Search
CPC ..... H04W 8/183; H04W 12/037; H04W 4/14; H04W 8/205; H04W 12/35
See application file for complete search history.

(56) References Cited

U.S. PATENT DOCUMENTS

| | | | | |
|---|---|---|---|---|
| 10,075,205 B2 * | 9/2018 | Lee | ....................... | H04L 67/306 |
| 10,630,646 B2 * | 4/2020 | Bone | .................... | H04L 63/029 |
| 10,652,731 B2 * | 5/2020 | Park | ...................... | H04W 12/72 |
| 10,652,735 B2 * | 5/2020 | Li | ........................... | G08B 5/222 |
| 11,812,258 B2 * | 11/2023 | Li | .......................... | H04W 8/205 |
| 11,849,317 B2 * | 12/2023 | Yoon | ..................... | H04W 12/35 |
| 12,114,166 B2 * | 10/2024 | Nitsch | ................... | H04L 9/085 |
| 12,273,472 B2 * | 4/2025 | Wane | .................... | H04W 12/06 |
| 2010/0151905 A1 * | 6/2010 | Inlow | ..................... | H04L 67/06 455/558 |
| 2010/0248690 A1 * | 9/2010 | Biggs | ................... | H04W 12/48 455/425 |

(Continued)

FOREIGN PATENT DOCUMENTS

WO     2008035183 A2     3/2008

OTHER PUBLICATIONS

Foreign communication from related application—European Extended Search Report and Search Opinion dated Aug. 7, 2024 regarding EP Application No. 24168068.5, filed Apr. 2, 2024, 10 pages.

*Primary Examiner* — Charles T Shedrick

(57)     ABSTRACT

A communication device includes a subscriber identity module (SIM), a central processing unit (CPU), and a non-transitory memory comprising executable instructions that when executed by the CPU, causes the SIM to receive an over-the-air (OTA) Internet Protocol (IP) notification from an OTA server via an IP notification server, where the OTA IP notification comprises SIM content comprising an encrypted payload, decrypt the encrypted payload to obtain a decrypted payload, wherein the decrypted payload includes data or a trigger instruction, determine whether the decrypted payload includes the trigger instruction, and update the SIM with the SIM content when the decrypted payload includes data.

14 Claims, 8 Drawing Sheets

(56)     References Cited

U.S. PATENT DOCUMENTS

| | | | |
|---|---|---|---|
| 2015/0189459 A1* | 7/2015 | Aon | H04W 4/70 |
| | | | 455/558 |
| 2015/0289152 A1* | 10/2015 | Shanmugam | H04W 24/04 |
| | | | 455/425 |
| 2015/0303966 A1* | 10/2015 | Lee | H04W 4/12 |
| | | | 455/466 |
| 2021/0219138 A1* | 7/2021 | Comarmond | H04W 8/205 |
| 2022/0038911 A1* | 2/2022 | Verma | H04W 12/06 |
| 2023/0093167 A1* | 3/2023 | Shah | H04W 12/35 |
| | | | 370/329 |

* cited by examiner

900

910 — I/O

902

904 — Secondary Storage

CPU

908 — RAM

906 — ROM

912 — Network Devices

SUBSCRIBER IDENTITY MODULE OVER-THE-AIR PUSH NOTIFICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communications devices such as mobile or consumer devices, and Machine-to-Machine (M2M) communications devices are widely deployed in a wireless network, such as a cellular network. Consumer devices may include, for example, smart phones, tablet computers, wearable computers, or portable and desktop computers while M2M communications devices may include thermostats, water heaters, refrigerators, smart power or water meters, parking meters, automobiles, pet trackers, and other everyday devices. The consumer and M2M devices are configured to access any number of cellular and IP networks for receiving services, updates, support, and other remote-control services, as other purposes. Cellular networks may exchange wireless signals with mobile communications devices using wireless network protocols. Exemplary wireless network protocols include Institute of Electrical and Electronic Engineers (IEEE) 802.11 (WIFI), Long Term Evolution (LTE), fifth generation (5G) new radio (5GNR), and Low-Power Wide Area Network (LP-WAN).

Mobile communications devices and other end-point devices may use a physical subscriber identification module (SIM) card, an Embedded Universal Integrated Circuit Card (EUICCs), also referred to as an Embedded Subscriber Identity Module (eSIM), or virtual SIMs to connect to a cellular network. There may be one or more SIMs on the communications device, and each SIM can store one or more SIM profiles, with each SIM profile being associated with a subscriber of a mobile carrier. The SIM profile enables the mobile carrier to identify its subscriber and securely authenticate the user's identity. In examples, the communications device may use these SIMs to access the cellular network of a mobile carrier (for example, a mobile network operator (MNO) or a mobile virtual network operator (MVNO)) in order to perform network functions such as voice, messaging, and data communications. When a communications device attempts to connect to the cellular network, the SIM transmits its stored 64-bit identifier, such as, for example, an International Mobile Subscriber Identity (IMSI) number and a code representing the subscriber authentication key, to the mobile carrier over the cellular network. Once the mobile carrier receives this information via the mobile network, it checks the information against a corresponding list of identifiers and keys in a database to verify the SIM, and correspondingly allows the communications device to complete the connection process if the information checks out. Conventionally, a mobile carrier may update the SIM by issuing a new SIM card or, alternatively, remotely update the SIM by sending a SIM Over-the-Air (OTA) notification (for example, push notification), which is a silent short messaging service (SMS) message. The SMS message includes updates and changes to configuration data of a SIM profile on the SIM.

SUMMARY

In an embodiment, a communication device comprising a subscriber identity module (SIM) is disclosed. the communication device includes a central processing unit (CPU) and a non-transitory memory comprising executable instructions that when executed by the CPU, causes the SIM to receive an over-the-air (OTA) Internet Protocol (IP) notification from an OTA server via an IP notification server, where the OTA IP notification comprises SIM content comprising an encrypted payload, decrypt the encrypted payload to obtain a decrypted payload, wherein the decrypted payload includes data or a trigger instruction, determine whether the decrypted payload includes the trigger instruction, and update the SIM with the SIM content when the decrypted payload includes data.

In another embodiment, an OTA server is disclosed. The OTA server comprises a CPU and a non-transitory memory comprising executable instructions that when executed by the CPU, causes the OTA server to determine SIM content for updating a SIM profile of a subscriber on a SIM of a communication device, send an OTA IP notification to the SIM based on determining the SIM content, wherein the OTA IP notification comprises the SIM content comprising an encrypted payload, wherein the encrypted payload includes data or a trigger instruction, and receives an update message from the SIM responsive to sending the OTA IP notification.

In yet another embodiment, a system comprising a communication device and an OTA server is disclosed. The communication device comprises a SIM that is configured to receive an over-the-air (OTA) Internet Protocol (IP) notification from an IP notification server, where the OTA IP notification comprises SIM content comprising an encrypted payload, decrypt the encrypted payload to obtain a decrypted payload, where the decrypted payload includes data or a trigger instruction, determine whether the decrypted payload includes the trigger instruction, and update a SIM profile of a subscriber on the SIM with the SIM content when the decrypted payload includes data. The OTA server is coupled to the communication device and configured to determine the SIM content for the SIM, and send the OTA IP notification to the SIM based on determining the SIM content.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
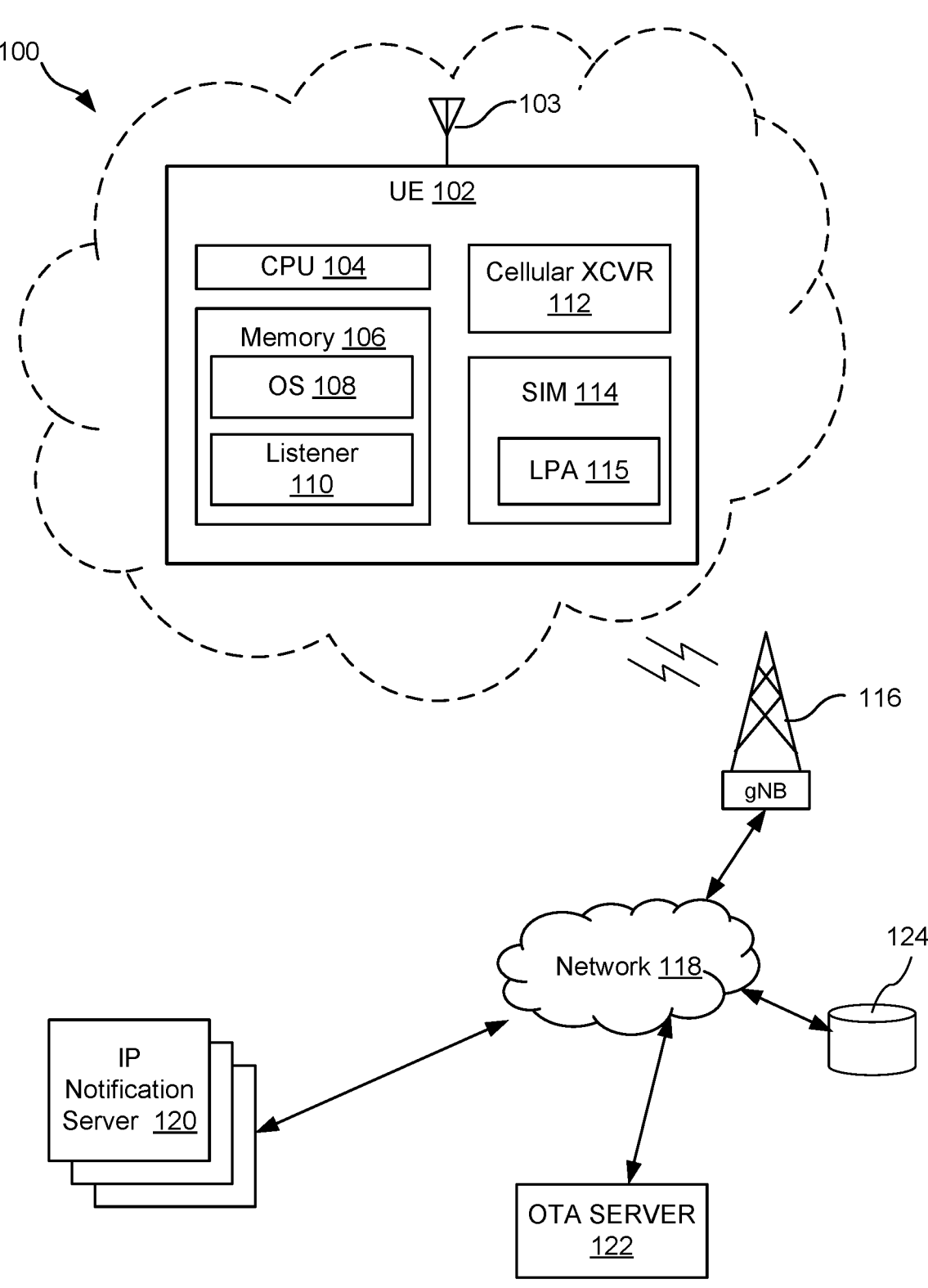
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Communications devices are widely deployed in cellular networks. Cellular networks may exchange wireless signals with communications devices using wireless network protocols. In a cellular network such as, for example, in a 5G cellular network, a base station can include a radio access network (RAN) node such as, for example, a 5G evolved or enhanced gigabit Node B (gNB). These RANs use a radio access technology (RAT) to communicate between the RAN Node and the communications device (or UE).

Communications devices and other end-point devices including M2M devices (hereinafter referred to as "communications device") may use SIM profiles of a subscriber of the cellular network to provide communication services to the subscriber. SIM profiles may be stored on physical SIM cards, Embedded Universal Integrated Circuit Cards (EUICCs) and/or virtual SIMs (hereinafter referred to as SIMs). A SIM profile on the SIM enables a mobile carrier of a cellular network to identify the subscriber as a registered subscriber of the cellular network/carrier network and securely authenticate their identity in order to accurately bill the subscriber for used airtime on the cellular network. The SIM may also store phone contacts, messages, roaming lists for different cellular networks, applets to enable communication and other functions, and many other value-added voice and data functions to the SIM profile. Currently, mobile carriers may remotely update the SIM profile via a short messaging service (SMS) message using an over-the-air (OTA) notification (also called OTA provisioning) without having to send a new physical SIM card with the requisite updates to the subscriber. A SMS OTA notification for updating the SIM profile is a silent SMS message with a datagram having the requisite updates and changes. However, SMS OTA notifications are being phased-out in the future. As a result, mobile carriers may not be able to rapidly and cost-effectively update SIM data over an SMS OTA notification for eSIMs or virtual SIMS. Further, updating a physical SIM card may require installing a new physical SIM card into the communications device with the requisite updates to the SIM profile.

In an embodiment, a communications device in the present application may be a consumer device such as, for example, a smart phone, a tablet computer, a wearable computer, or portable and desktop computers, or an M2M device such as, for example, a thermostat, refrigerator, water meter, and other everyday devices. In an example, the communications device comprises a SIM that interfaces with a listener application and a local profile assistant (LPA) application. The listener application may be a client application of an Internet Protocol (IP) notification service that receives OTA notifications from an IP Notification server over an IP connection from the OTA server ("the cloud"). In an example, the listener application receives OTA notifications over an IP address that is sent from an OTA server associated with a mobile carrier via the IP Notification server. In an embodiment, the OTA server may be a server of a push notification provider that provides voice and data services to the communications device, such as a mobile carrier. In an embodiment, the communications device registers to receive OTA notifications from the IP notification server. In an example, registering the communications device may include registering the SIM for a SIM update topic that includes receiving OTA notifications for updating the SIM data ("SIM OTA notification"). In examples, updating the SIM data includes updating one or more of phone contacts, messages, roaming lists for different cellular networks, applets to enable communication and other functions. In an embodiment, the OTA notifications are received by the listener application and may include datagrams and/or trigger instructions for updating the SIM profile on the SIM. In an embodiment, OTA notifications are encrypted messages that contain a SIM payload with one or more datagrams, which may be directly installed onto the SIM to remotely configure its SIM profile. In another embodiment, the encrypted messages may include encrypted trigger instructions (e.g., trigger information) which may be Uniform Resource Locator (URL) addresses or IP addresses on the Internet where data (for example, one or more files or file folders having data) may be retrieved/fetched by the SIM over the cellular network. Thus, a mobile carrier may remotely update the SIM profile of a SIM on a communication device via an OTA notification over IP. As SMS notifications are being deprecated in future cellular networks, the mobile carrier may rapidly and cost-effectively update SIM data over a wireless connection without having to send a new physical SIM card with the requisite updates to the subscriber. Further, as some communication devices use eSIMs or virtual SIMs, there may be concerns for provisioning SIM profiles changes to these communication devices.

Turning now to FIG. 1, a communication system 100 is described according to an embodiment. In an embodiment, the communication system 100 is configured to send IP OTA notifications (or push messages) to user equipment/communications devices. The OTA notifications may be received from an IP notification server via an IP notification service (e.g., a push notification service). In an example, the OTA notifications are sent using IP and have a payload comprising, in some examples, configuration files, data files and/or URLs or IP address of files and data on a cloud database, and other similar information for updating a SIM of the communications device. While the communication system 100 is described for updating or configuring a SIM profile of a SIM using IP OTA notifications, the communication system may also be contemplated for use with other IP OTA notifications for remotely receiving data for third-party applications on the communications device that may include configuration data, advertisements, and other similar information whether or not the third-party applications are open and in use on the communications device.

In an embodiment, the communication system 100 may comprise user equipment (UE) 102, cell site 116, a communication network 118, an IP notification server 120, an OTA server 122, and storage 124. The UE 102 may be a communications device such as, for example, a smart phone, a wearable computer or another mobile communications device, or an M2M device such as, for example, a smart vehicle, a smart refrigerator, a smart meter, or another similar smart device that has one or more processors, memory, and transceiver components. The UE 102 may be a fixed communications device or a mobile communications device. In an embodiment, the UE 102 comprises an antenna 103, a central processing unit (CPU) 104, a memory 106 that stores an operating system (OS) 108, a listener application 110, a cellular transceiver 112, a SIM 114, and a local profile assistant (LPA) application 115.

In an embodiment, the antenna 103 may be communicatively coupled to the cellular transceiver 112 and the listener application 110 through a wired connection. The antenna 103 may include radio frequency (RF) reception and transmission components of the UE 102, and may be part of the cellular transceiver 112. In an embodiment, the cellular transceiver 112 may establish a radio communication link to the cell site 116 using the antenna 103. The radio communication link may be established according to an LTE protocol, a Code Division Multiple Access (CDMA) protocol, a Global System for Mobile Communications (GSM) protocol, or a 5th generation mobile network (5G) telecommunication protocol. In an embodiment, the cellular transceiver 112 includes a 5G RAT that provides an air interface for the UE 102. While not shown in FIG. 1, the cellular radio transceiver 112 may include additional circuit components to process and manipulate the wireless signals at the UE 102.

The memory 106 comprises a non-transitory portion that embeds one or more applications for execution by the CPU 104. In embodiments, the memory 106 embeds an operating system (OS) 108 and a listener application 110 (hereinafter "listener 110"). In an embodiment, the OS 108 comprises executable instructions of an OS kernel of the UE 102. In an embodiment, the OS 108 may be executed to perform operations such as, for example, operations to manage input/output data requests to the UE 102 (e.g., from software and/or applications), translate the requests into instructions (e.g., data processing instructions) for execution by the CPU 104 or other components of the UE 102, manage the UE 102 resources, such as the CPU 104 and the memory 106 when executing and providing services to applications on the UE 102 such as the listener 110.

In an embodiment, the listener 110 is configured as a client application of an IP notification service that may receive OTA notifications over IP ("OTA notifications") from IP notification server 120. In examples, the IP notification service is a cloud-based notification service such as, for example, an Apple Push Notification service (APNs) by APPLE or a Firebase Cloud Messaging (FCM) service by GOOGLE that sends OTA notifications over IP. In an example, the listener 110 may receive the OTA notifications from a push notification provider, such as a mobile carrier or a third-party application provider based on the UE 102 registering the SIM 114 with the IP notifications server 120 to receive OTA notifications. The listener 110 comprises executable instructions that when executed by the CPU 104 may actively monitor UE 102 for any OTA notifications or messages that are received at the UE 102 from the IP notification server 120 over an IP connection. In an example, the UE 102 is registered to receive OTA notifications using an IP notification service of IP notification server 120. In another example, when the UE 102 is started, the CPU 104 is configured to be capable of executing instructions or code of the listener 110 to form an IP connection between the listener 110 and the IP notification service.

In an example, the UE 102 may register to receive OTA notifications for one or more topics with the IP notification server 120. A topic defines a category of communications that may be received for one or more third-party applications on UE 102 or for the SIM 114 on UE 102. In examples, the topics may be push notification messages that identify authorized communications that are to be received for each third-party application installed on the UE 102, and may include OTA notifications for software updates, advertisements, promotion messages, or the like for each third-party application that the user registers to receive OTA notifications. In an example, the user may authorize the listener 110 to register the SIM 114 to receive OTA notifications for a SIM update topic as well as register for other topics related to third-party applications on the UE 102. A SIM update topic may include SIM update messages with datagrams and/or trigger instructions for configuring the SIM profile and that is received by listener 110.

In examples, the OTA notifications may be received via a secure connection from IP notification server 120 for updating a SIM profile of SIM 114 or for updating one or more third-party applications via the IP notification server 120. In examples, OTA notification for a SIM update topic may include a payload with data updates and/or trigger instructions in its payload that direct the SIM 114 to retrieve the information from the OTA server 122. In an example, the SIM 114 may use the LPA application 115 to retrieve data and other files that are included as part of the data updates to the SIM profile of the SIM 114. In an example, the LPA 115 may initiate the download of the data updates to the SIM 114 according to the instructions in the trigger instructions of the payload. In another example, the trigger instructions may include IP addresses (e.g., network addresses of a path to servers on network 118) that direct the UE 102 to OTA server 122 for updating the SIM profile on SIM 114. In various examples, network addresses may be a URL address, an IP address, or some other identifier that identifies a file or file directories on a network where the SIM of the UE 102 may access SIM updates. In an example, OTA server 122 may authenticate UE 102 and use token exchange between OTA server 122 and UE 102 to authenticate and identify UE 102 before granting the listener application 110 access to SIM updates on OTA server 122.

In an example, OTA notifications are encrypted messages that encrypt a SIM payload. In an example, the SIM payload includes encrypted binary data having configuration data and attributes for use by the SIM 114 to configure the SIM profile such as preferred roaming lists (PRLs), contacts, applets, phone number, or the like. The SIM payload may be decrypted by the SIM 114 using asymmetric key encryption between the OTA server 122 and the UE 102 in order to extract the contents of the SIM payload and apply (for example, store) the extracted contents to local data that is stored on the SIM 114. In another example, the SIM payload may also include encrypted trigger instructions (e.g., trigger information) that may be URL addresses or IP addresses of file locations at storage 124 of the OTA server 122 where data may be retrieved/fetched by the SIM 114 over the network 118.

The SIM 114 may be implemented, in some examples, as a removable smart card, as an embedded smart card having a smart-card chip soldered onto the motherboard of the UE 102, as a virtual SIM card or as an electronic SIM card with the SIM function being provided by software instructions in the UE 102, that when executed by the CPU 104, provides traditional SIM card functionality and security via the virtual SIM card. As used in the present specification, the term "SIM" or "SIM card" may refer to any one of the three different forms of SIMs disclosed above.

The UE 102 may be communicatively coupled to the cell site 116. The cell site 116 connects the UE 102 to a communication network 118, an IP notification server 120, and an OTA server 122. The communication network 118 may be a core network (for example, a macro network) of a network provider or the Internet Network. In an embodiment, the UE 102 may request 5G services via the cell site 116 of the communication network 118 using the radio communication link. In examples, the communication between the communication network 118 and UE 102 may be established according to an LTE protocol, a CDMA protocol, a GSM protocol, or a 5G telecommunication protocol. The communication network 118 may provide 5G services to the UE 102 using network functions, that include voice, data, and messaging services. The communication network 118 may be communicatively coupled to OTA server 122 for receiving OTA notifications that include data updates and/or triggers with network addresses for implementing updates to a SIM profile on the SIM 114. The OTA server 122 may be associated with a mobile carrier of the subscriber associated with the SIM profile on the SIM 114. The system 100 may comprise additional communication networks similar to communication network 118 and any number of cell sites 116.

In various examples, IP notification server 120 may include a cloud-based IP notification service such as APNS or FCM notification service. The IP notification server 120 uses the IP notification service to send the OTA notifications to listener 110, and may include encrypted information discussed above. The datagrams may be directly applied once decrypted by the SIM 114. In another example, the decrypted trigger instructions include IP addresses of documents and file locations at storage 124 where SIM configuration data may be retrieved. In an example, each OTA notification that is received on UE 102 for updating a different SIM profile may be encrypted using a different pair of asymmetric encryption keys between the UE 102 and the OTA server 122.

Figure 2:
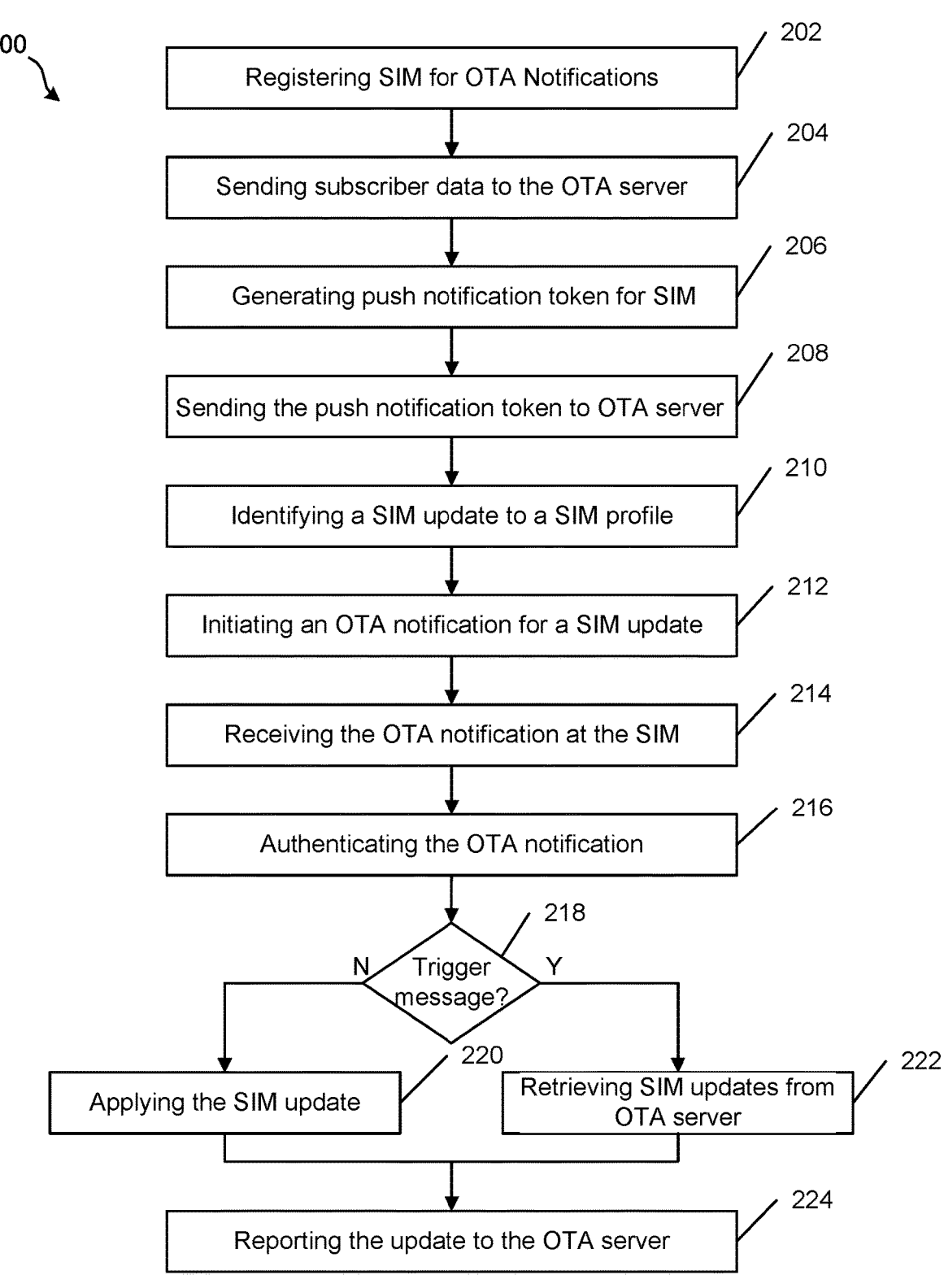
FIG. 2 is a flow chart of a method according to an embodiment of the disclosure.

Turning now to FIG. 2, and with continued reference to FIG. 1, a method 200 is described. In an embodiment, the method 200 is a process for communicating OTA notifications over IP to a SIM of a communications device for updating the SIM. In examples, the communications device may be a consumer device or an M2M device such as, for example, the UE 102 in FIG. 1 and may receive data and/or triggers in the OTA notifications to update one or more SIM profiles of the SIM.

At block 202, the method 200 comprises registering the SIM for OTA notifications. In an example, a user of the communications device may use the listener 110 to transmit, via the network 118, registration information to the IP notification server 120 that includes information to register the SIM to receive OTA notifications over IP. Registering the SIM includes subscribing the SIM to receive OTA notifications for a SIM update topic that includes receiving configuration updates to a SIM profile on the SIM. The user of the communications device may be the subscriber of a mobile carrier having one or more SIM profiles on the SIM and may register each SIM profile individually to receive an OTA notification to update the SIM profile of the subscriber on the SIM. In examples, the user may register the communications device with the IP notification server 120 to receive OTA notifications on additional topics such as receiving data updates, advertisements and promotions related to third-party applications on the communications device, or other similar topics. In an example, turning on the communications device automatically initiates registration with the IP notification server 120 after the initial registration is performed.

At block 204, the method 200 comprises sending subscriber information to the OTA server 122. In an example, the IP notification service of the IP notification server 120 sends subscriber identification information to the OTA server 122 upon receiving instructions to register the SIM for OTA notifications. In an example, the listener 110 sends instructions to the IP notification server 120 to authorize the IP notification service of the IP notification server 120 to receive OTA notifications for a SIM update topic. In an example, the IP notification server 120 sends the authorization to the OTA server 122. In other examples, the IP notification server 120 sends user information of third-party applications on the communications device to other servers for authorizing OTA notifications for one or more other topics to be received for services and updates of other third-party applications on the communications device. In an example, the listener 110 sends subscriber identification information of the SIM to the OTA server 122 via the IP notification service, and instructions that authorize the OTA server 122 to push SIM updates to the SIM using OTA notifications over IP.

At block 206, the method 200 comprises generating a token for the SIM. In an example, the IP notification server 120 generates a push notification token for the subscriber using the subscriber identification information received from the OTA server 122. In an example, the token is an authentication token). The token identifies the subscriber for the SIM that the subscriber subscribes to. The authentication token may be mapped to the subscriber's information at the UE 102 and further authorizes the SIM to receive the OTA notifications related to SIM updates. In an example, the IP notification server 120 may generate additional tokens for other SIM profiles on the SIM. In an example, the SIM may include several SIM profiles of the same or different mobile carriers, and each issued token identifies a particular SIM profile on the SIM that is to be updated.

At block 208, the method 200 comprises sending the push notification token to the OTA server 122. In an example, the token associated with the SIM profile on the SIM is sent to the OTA server 122, which transmits the token to the storage 124 (for example, a database). In an example, the token may be used by the OTA server 122 to reference or identify a subscriber during data exchange between the OTA server 122 and the IP notification server 120.

At block 210, the method 200 comprises identifying a SIM update to a SIM profile of a subscriber on the SIM. In examples, either the OTA server 122 or the SIM may determine that the SIM is to be updated. In an example, the OTA server 122 may determine that the SIM is to be updated based on changed subscriber information such as change to a preferred roaming list (PRL) for one or more profiles of the SIM that is stored at the OTA server 122. In an example, the OTA server 122 may determine that the SIM is to be updated with small data content (for example, approximately 2 kilobytes (KB)) or, alternatively, may determine that the SIM update may require large data content (for example, greater than 2 KB). In an example, the mobile carrier determines that subscriber configuration data and/or attributes of a subscriber's SIM profile on the SIM is to be updated with updated content. In another example, the SIM determines that the SIM profile is to be updated such as, changes to contacts, PRLs, applets, or the like, based on running one or more diagnostic applications on the SIM. In an example, the LPA application may run a diagnostic operation on the SIM to determine which SIM profiles need an update, and sends results of the diagnostic operation to the OTA server 122 via an OTA notification. In an example, the SIM sends the results of the diagnostic operation and token information to the OTA server 122, that is used by the OTA server 122 to map a SIM update to the subscriber of the SIM.

At block 212, the method 200 comprises initiating an OTA notification for a SIM update. In an example, the OTA server 122 initiates an OTA notification whereby the OTA server 122 sends an OTA notification over IP with an embedded SIM update to the IP notification server 120. In an example, the OTA server 122 encrypts the SIM content into ciphertext using asymmetric key encryption (also called public-key encryption) and sends the OTA notification to the IP notification server 120. In an example, the OTA notification includes SIM content with header information and a payload of the SIM update that is encrypted into an embedded ciphertext. In an example, the header identifies the SIM and/or identifies an update to a SIM profile on the SIM for the OTA notification message. In an example, when the SIM update requires small data content to be pushed to the communications device via the OTA notification, the payload includes encrypted data that includes all information to directly update the SIM without requiring further OTA notifications with SIM updates to be sent to the communications device. In another example, if the SIM update is to be updated with large data content, the payload includes encrypted trigger content having information where the SIM may retrieve/fetch data from the OTA server 122. In an example, the encrypted trigger content may include a trigger request such as, for example, a URL address or a link to data files where updates to the SIM profile may be retrieved/fetched by the SIM from the network 118.

At block 214, the method 200 comprises receiving the OTA notification at the SIM. In an example, the IP notification server 120 sends the OTA notification to the communications device. In an example, the listener 110 actively monitors the communications device for any notifications that are received over an IP connection. In an example, the listener 110 reads the header of the OTA notification that identifies the SIM as the recipient of the OTA notification, and sends the OTA notification to the SIM based on the header. In examples, the OTA notification may include information in the header that instructs the listener 110 to pass-through the OTA notification to the SIM without displaying contents of the OTA notification on a display of the communications device.

At block 216, the method 200 comprises authenticating the OTA notification. In an example, the SIM decrypts the OTA notification to obtain the decrypted payload and information to authenticate the sender of the OTA notification. In an example, the decrypted OTA notification includes identification information that identifies the wireless carrier as the source of the OTA notification and that is associated with the SIM profile on the SIM.

At block 218, the method 200 comprises determining whether the decrypted payload includes a trigger instruction or message. If at block 218, the OTA notification does not include a trigger instruction (i.e., the block 218=N), then at block 220, the method 200 comprises applying the data content of the payload to a file system on the SIM to update the SIM. Applying the data content includes storing the extracted contents to local data in order to update the SIM profile on the SIM. However, if at block 218, the OTA notification includes a trigger instruction (i.e., the block 218=Y), then at block 222, the method 200 comprises retrieving/fetching data updates from OTA server 122. In an example, the SIM uses the LPA 115 to communicate with the OTA server 122 to send IP requests to OTA server 122 having the URL addresses or other IP addresses of file locations in order to retrieve the SIM updates from OTA server 122 over network 118. The SIM updates may be received by the SIM from storage 124 via IP messages over network 118. In an example, the SIM applies the data contents to a file system on the SIM so as to update the SIM profile on the SIM.

At block 224, the method 200 comprises reporting the update to the OTA server 122. In an example, the SIM sends an IP message to the OTA server 122 that indicates a result of an update to the SIM profile based on the OTA notification. In an example, the OTA server 122 may request the SIM 114 to provide updates to the SIM profile based on the OTA notification that was sent by the OTA server 122. In other examples, the SIM 114 may not send an update.

Figure 3:
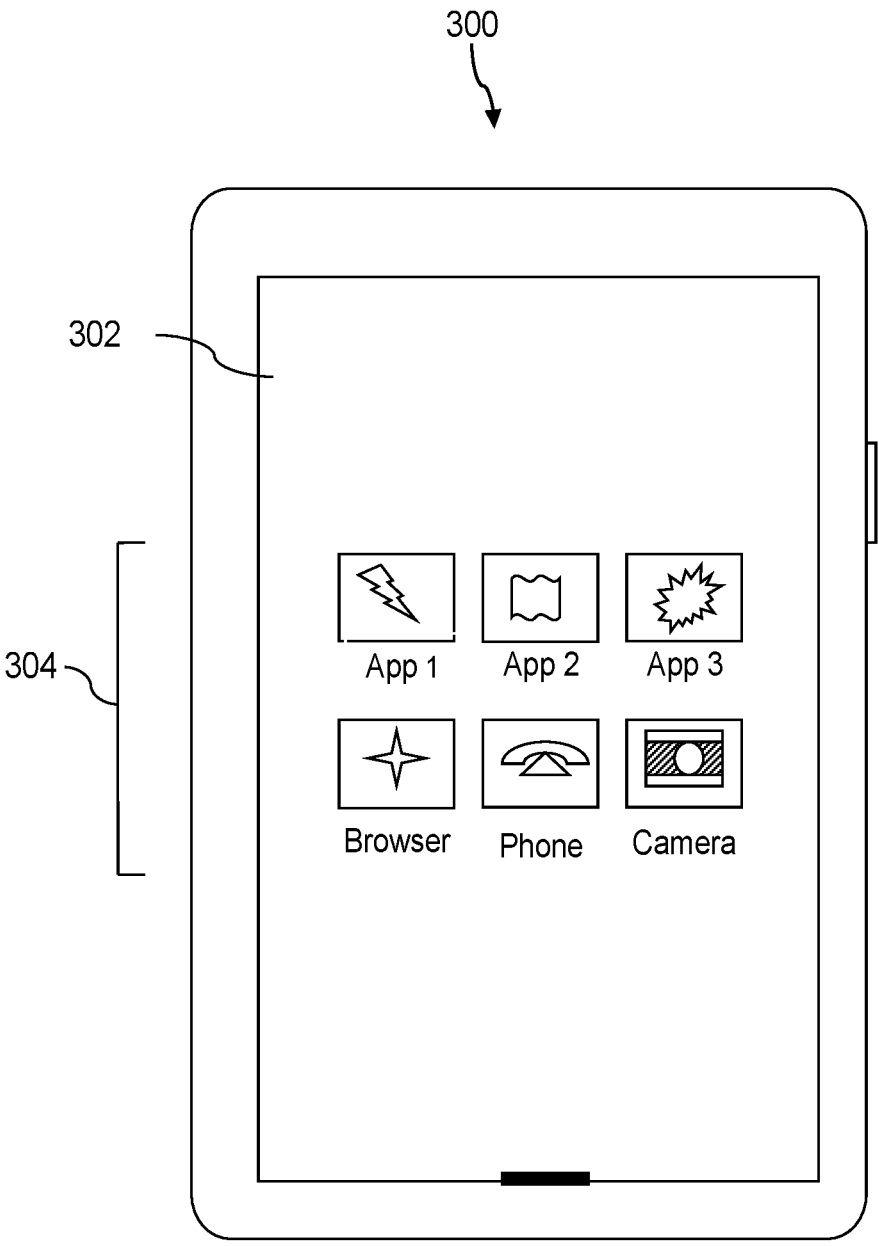
FIG. 3 is an illustration of a communications device according to an embodiment of the disclosure.

FIG. 3 depicts user equipment (UE) 300, which is operable for implementing aspects of the present disclosure, but the present disclosure should not be limited to these implementations. Though illustrated as a communications device, the UE 300 may take various forms including a smart vehicle, a smart appliance (for example, a smart refrigerator), a smart phone, a wearable computer, a personal digital assistant (PDA), a headset computer, a laptop computer, a notebook computer, and a tablet computer.

The UE 300 may include a display 302 such as, for example, a touchscreen display having a touch-sensitive surface for input by a user or a regular display without a touch-sensitive surface. A small number of application icons 304 are illustrated within the touch screen display 302. It is understood that in different embodiments, any number of application icons 304 may be presented in the touch screen display 302. In some embodiments of the UE 300, a user may be able to download and install additional applications on the UE 300, and an icon associated with such downloaded and installed applications may be added to the touch screen display 302 or to an alternative screen. The UE 300 may have other components such as electro-mechanical switches, speakers, camera lenses, microphones, input and/or output connectors, and other components as are well known in the art. The UE 300 may present options for the user to select, controls for the user to actuate, and/or cursors or other indicators for the user to direct. The UE 300 may further accept data entry from the user, including numbers to dial or various parameter values for configuring the operation of the handset. The UE 300 may further execute one or more software or firmware applications in response to user commands. These applications may configure the UE 300 to perform various customized functions in response to user interaction. Additionally, the UE 300 may be programmed and/or configured over-the-air, for example from a wireless base station, a wireless access point, or a peer UE 300. The UE 300 may execute a web browser application which enables the touch screen display 302 to show a web page. The web page may be obtained via wireless communications with a base transceiver station, a wireless network access node, a peer UE 300 or any other wireless communication network or system.

Figure 4:
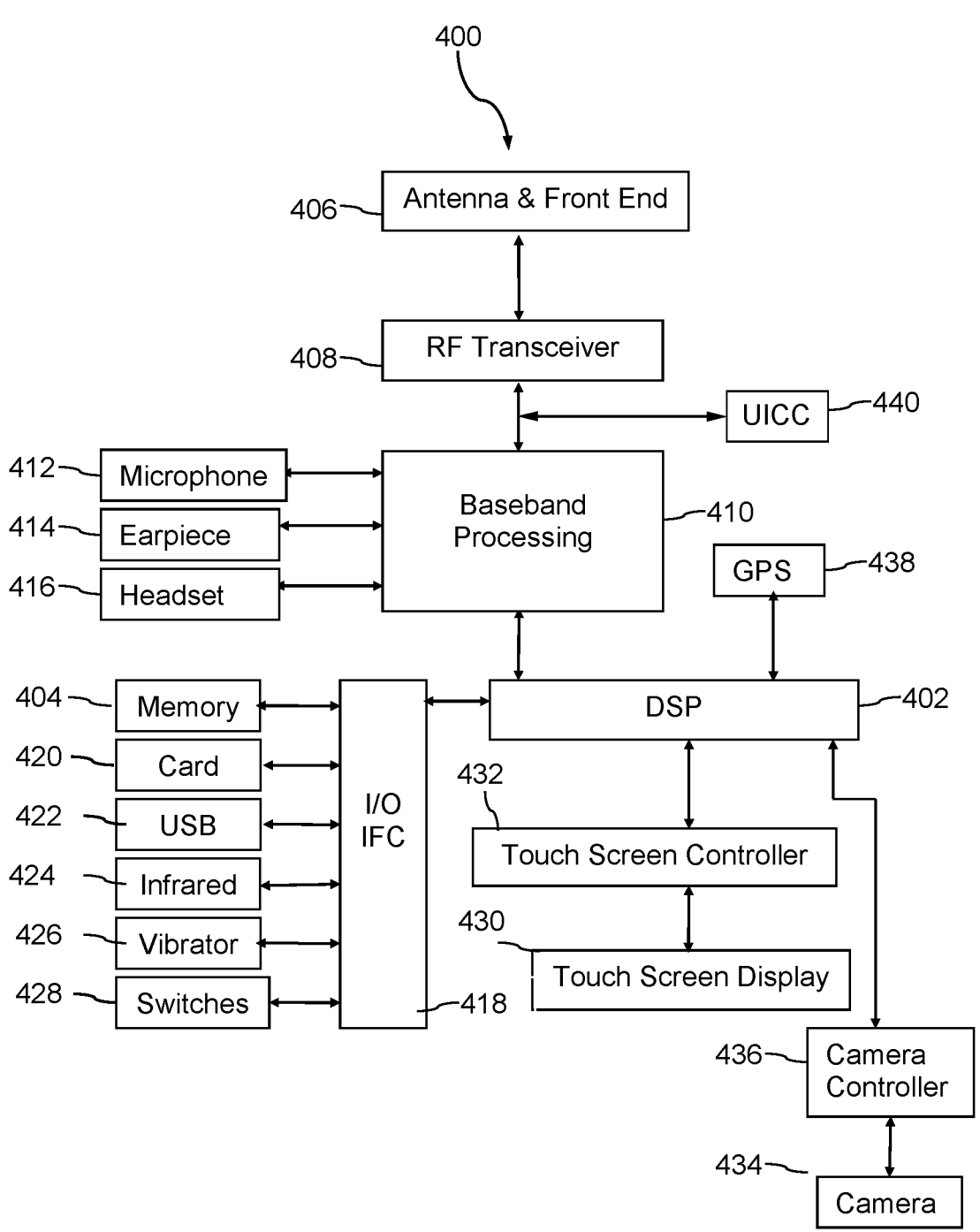
FIG. 4 is a block diagram of a hardware architecture of a communications device according to an embodiment of the disclosure.

FIG. 4 shows a block diagram of the UE 400. While a variety of known components of a communication device are depicted, in an embodiment a subset of the listed components and/or additional components not listed may be included in the UE 400. The UE 400 includes a digital signal processor (DSP) 402 and a memory 404. As shown, the UE 400 may further include one or more antenna and front end unit 406, a one or more radio frequency (RF) transceiver 408, a baseband processing unit 410, a microphone 412, an earpiece speaker 414, a headset port 416, an input/output (I/O) interface 418, a removable memory card 420, a universal serial bus (USB) port 422, an infrared port 424, a vibrator 426, one or more electro-mechanical switches 428, a touch screen display 430, a touch screen controller 432, a camera 434, a camera controller 436, and a global positioning system (GPS) receiver 438. In an embodiment, the UE 400 may include another kind of display that does not provide a touch sensitive screen. In an embodiment, the UE 400 may include both the touch screen display 430 and additional display component that does not provide a touch sensitive screen. In an embodiment, the DSP 402 may communicate directly with the memory 404 without passing through the input/output interface 418. Additionally, in an embodiment, the UE 400 may comprise other peripheral devices that provide other functionality.

The DSP 402 or some other form of controller or central processing unit operates to control the various components of the UE 400 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the UE 400 to function as a peripheral device to exchange information with a personal computer or other computer system. The infrared port 424 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, an LTE protocol, a CDMA protocol, a GSM protocol. In an embodiment, one of the radio frequency (RF) transceivers 408 may comprise a near field communication (NFC) transceiver. The NFC transceiver may be used to complete payment transactions with point-of-sale terminals or other communications exchanges. In an embodiment, each of the different RF transceivers 408 may be coupled to its own separate antenna. In an embodiment, the UE 400 may comprise a radio frequency identify (RFID) reader and/or writer device.

The switches 428 may couple to the DSP 402 via the input/output interface 418 to provide one mechanism for the user to provide input to the UE 400. Alternatively, one or more of the switches 428 may be coupled to a motherboard of the UE 400 and/or to components of the UE 400 via a different path (e.g., not via the input/output interface 418), for example coupled to a power control circuit (power button) of the UE 400. The touch screen display 430 is another input mechanism, which further displays text and/or graphics to the user. The touch screen LCD controller 432 couples the DSP 402 to the touch screen display 430. The GPS receiver 438 is coupled to the DSP 402 to decode global positioning system signals, thereby enabling the UE 400 to determine its position. In an embodiment, the UE 400 is the UE 102 of FIG. 1 that may include a smart high-science appliance such as a smart vehicle, a smart appliance (for example, a smart refrigerator), a smart phone, a wearable computer, a personal digital assistant (PDA), a headset computer, a laptop computer, a notebook computer, and a tablet computer.

A SIM 440 may be implemented, in some examples, as an embedded smart card (for example, as a UICC) having a smart-card chip and may be, in some examples, part of the baseband processing unit 410, part of the RF transceiver 408, or as a separate smart-card soldered onto a motherboard of the UE 400 and in communication with the baseband processing unit 410 or the RF transceiver 408.

Figure 5:
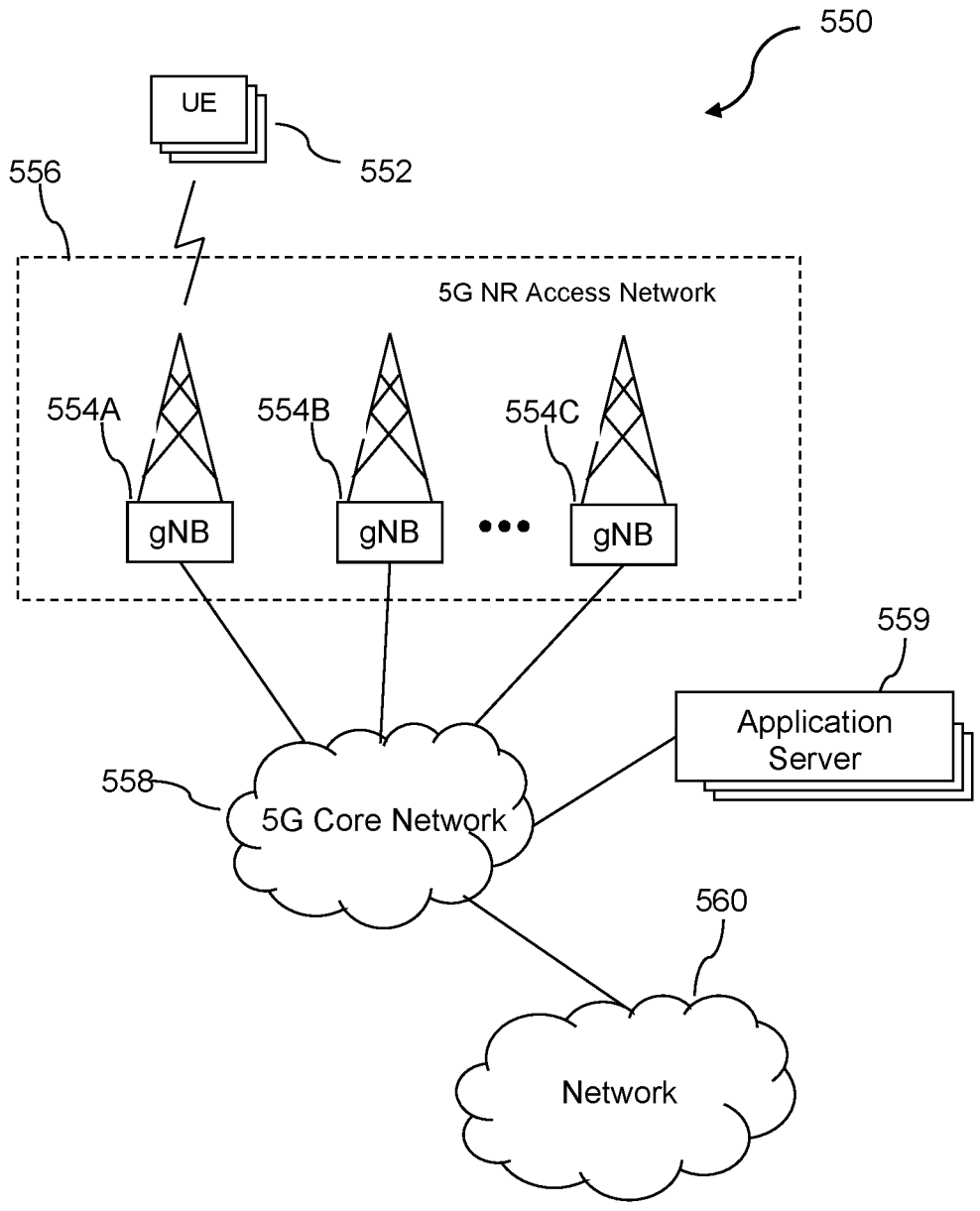
FIG. 5 is a block diagram of a communication system according to an embodiment of the disclosure.

Turning now to FIG. 5, an exemplary communication system 550 is described. Parts of the 5G communication network 118 described above with reference to FIG. 1 may be implemented substantially like the communication system 550 described in FIG. 5 and FIG. 6. Typically, the communication system 550 includes a number of access nodes 554A-554C that are configured to provide coverage in which UEs 552 such as cell phones, tablet computers, machine-type-communications devices, tracking devices, embedded wireless modules, and/or other wirelessly equipped communications devices (whether or not user operated), can operate. The UE 552 may be the UE 102 that operates with the 5G communication network 118 (FIG. 1). The access nodes 554A-554C may be said to establish an access network 556. The access network 556 may be referred to as a radio access network (RAN) in some contexts. In a 5G technology generation, an access node 554A-554C may be referred to as a gigabit Node B (gNB). In 4G technology (e.g., long term evolution (LTE) technology) an access node 554A-554C may be referred to as an enhanced Node B (eNB). In 3G technology (e.g., code division multiple access (CDMA) and global system for mobile communication (GSM)) an access node 554A-554C may be referred to as a base transceiver station (BTS) combined with a basic station controller (BSC). In some contexts, the access node 554A-554C may be referred to as a cell site or a cell tower. In some implementations, a picocell may provide some of the functionality of an access node 554A-554C, albeit with a constrained coverage area. Each of these different embodiments of an access node 554A-554C may be considered to provide roughly similar functions in the different technology generations.

In an embodiment, the access network 556 comprises a first access node 554A, a second access node 554B, and a third access node 554C. It is understood that the access network 556 may include any number of access nodes 554A-554C. Further, each access node 554A-554C could be coupled with a 5G core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554A-554C and could thereby communicate via the access node 554A-554C with various application servers and other entities. In another embodiment, the sub-systems may communicate via the access nodes 554A-554C.

The communication system 550 could operate in accordance with a particular RAT, with communications from an access node 554A-554C to UEs 552 defining a downlink or forward link and communications from the UEs 552 to the access node 554A-554C defining an uplink or reverse link. Over the years, the industry has developed various generations of RATs, in a continuous effort to increase available data rate and quality of service for end users. These generations have ranged from "1 G," which used simple analog frequency modulation to facilitate basic voice-call service, to "4G"—such as LTE, which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554A-554C could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in an RF spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554A-554C and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554A-554C to served UEs 552. And on the uplink, certain resource elements could be reserved to carry random access signaling from UEs 552 to the access node 554A-554C, and other resource elements could be reserved to carry other control signaling such as PRB-scheduling requests and acknowledgement signaling from UEs 552 to the access node 554A-554C.

The access node 554A-554C, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center. The Cu may be hosted in user equipment.

Figure 6:
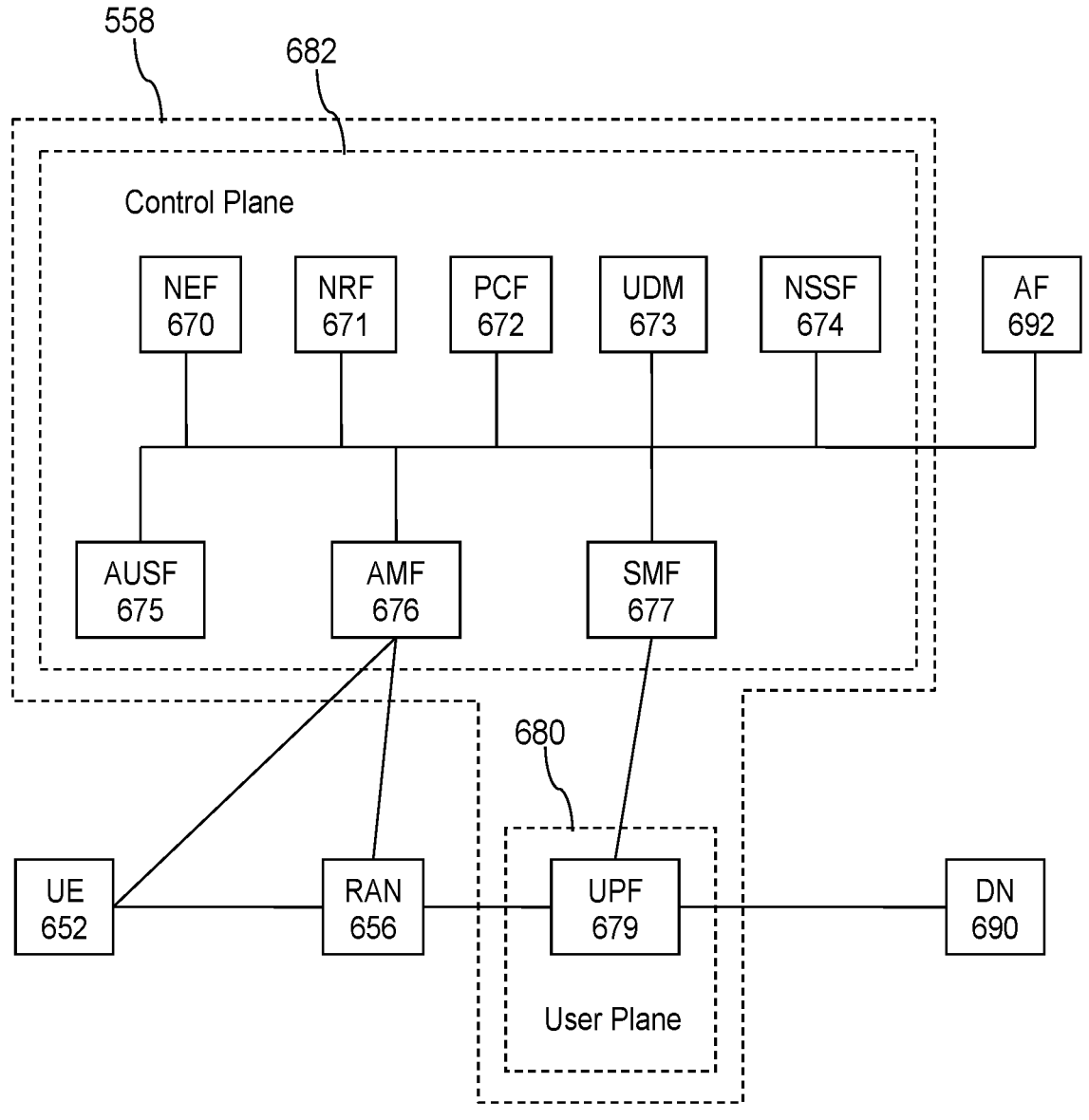
FIG. 6 is a block diagram of a core network of a communication system according to an embodiment of the disclosure.

Turning now to FIG. 6, further details of the core network 558 are described. In an embodiment, the core network 558 is a 5G core network. In an embodiment, the core network 558 may be constructed on the UE 102 (FIG. 1). 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed in a private domain environment which supports dynamic scaling and avoidance of long-term capital expenditures (fees for use may substitute for capital expenditures). In an embodiment, these services or network functions may be executed on user equipment such as, for example, executed on the UE 102 of FIG. 1. These network functions can include, for example, a user plane function (UPF) 679, an authentication server function (AUSF) 675, an access and mobility management function (AMF) 676, a session management function (SMF) 677, a network exposure function (NEF) 670, a network repository function (NRF) 671, a policy control function (PCF) 672, a unified data management (UDM) 673, a network slice selection function (NSSF) 674, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 680 and a control plane 682, thereby promoting independent scalability, evolution, and flexible deployment.

The UPF 679 delivers packet processing and links the UE 652, via the access node 656, to a data network 690 (e.g., the network 560 illustrated in FIG. 5 or the communication network 118 in FIG. 1). As discussed above, the UE 552 may be the UE 102 that operates with the 5G communication network 118 (FIG. 1). The AMF 676 handles registration and connection management of non-access stratum (NAS) signaling with the UE 552. Said in other words, the AMF 676 manages UE registration and mobility issues. The AMF 676 manages reachability of the UEs 552 as well as various security issues. The SMF 677 handles session management issues. Specifically, the SMF 677 creates, updates, and removes (destroys) protocol data unit (PDU) sessions and manages the session context within the UPF 679. The SMF 677 decouples other control plane functions from user plane functions by performing dynamic host configuration protocol (DHCP) functions and IP address management functions. The AUSF 675 facilitates security processes.

The NEF 670 securely exposes the services and capabilities provided by network functions. The NRF 671 supports service registration by network functions and discovery of network functions by other network functions. The PCF 672 supports policy control decisions and flow-based charging control. The UDM 673 manages network user data and can be paired with a user data repository (UDR) that stores user data such as customer profile information, customer authentication number, and encryption keys for the information. An application function 692, which may be located outside of the core network 558, exposes the application layer for interacting with the core network 558. In an embodiment, the application function 692 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 674 can help the AMF 676 to select the network slice instance (NSI) for use with the UE 552.

Figure 7:
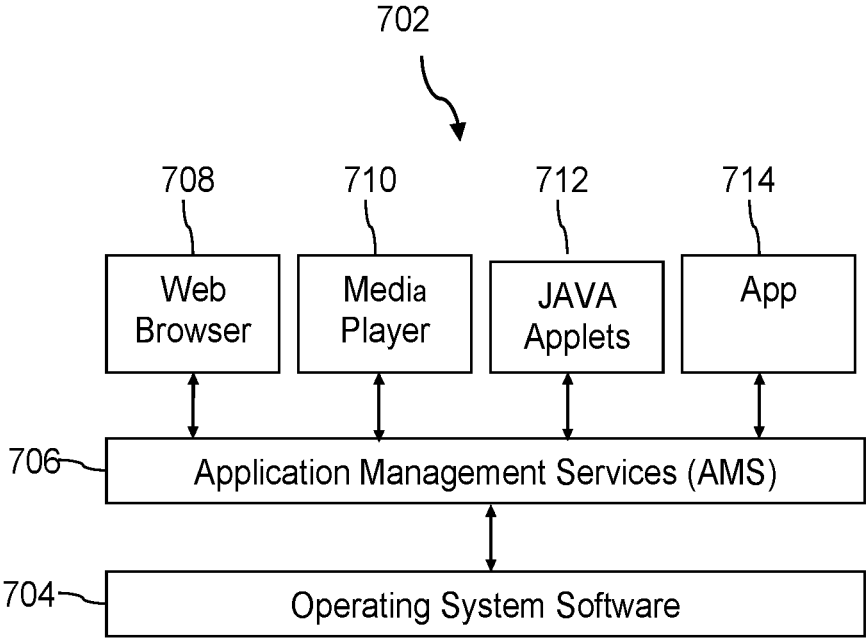
FIG. 7 is a block diagram of software architecture of a communications device according to an embodiment of the disclosure.

FIG. 7 illustrates a software environment 702 that may be implemented by the DSP 402. The DSP 402 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on the UE 400. Also shown in FIG. 7 are a web browser application 708, a media player application 710, and JAVA applets 712. The web browser application 708 may be executed by the UE 400 to browse content and/or the Internet, for example when the UE 400 is coupled to a network via a wireless link. The web browser application 708 may permit a user to enter information into forms and select links to retrieve and view web pages. The media player application 710 may be executed by the UE 400 to play audio or audiovisual media. The JAVA applets 712 may be executed by the UE 400 to provide a variety of functionality including games, utilities, and other functionality.

Figure 8:
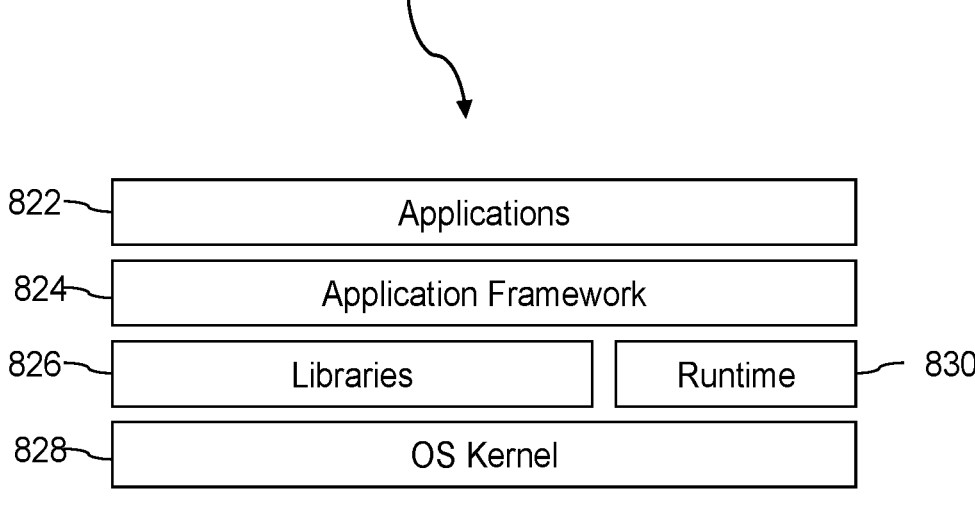
FIG. 8 is a block diagram of another software architecture of a communications device according to an embodiment of the disclosure.

FIG. 8 illustrates an alternative software environment 820 that may be implemented by the DSP 402. The DSP 402 executes operating system kernel (OS kernel) 828 and an execution runtime 830. The DSP 402 executes applications 822 that may execute in the execution runtime 830 and may rely upon services provided by the application framework 824. Applications 822 and the application framework 824 may rely upon functionality provided via the libraries 826.

Figure 9:
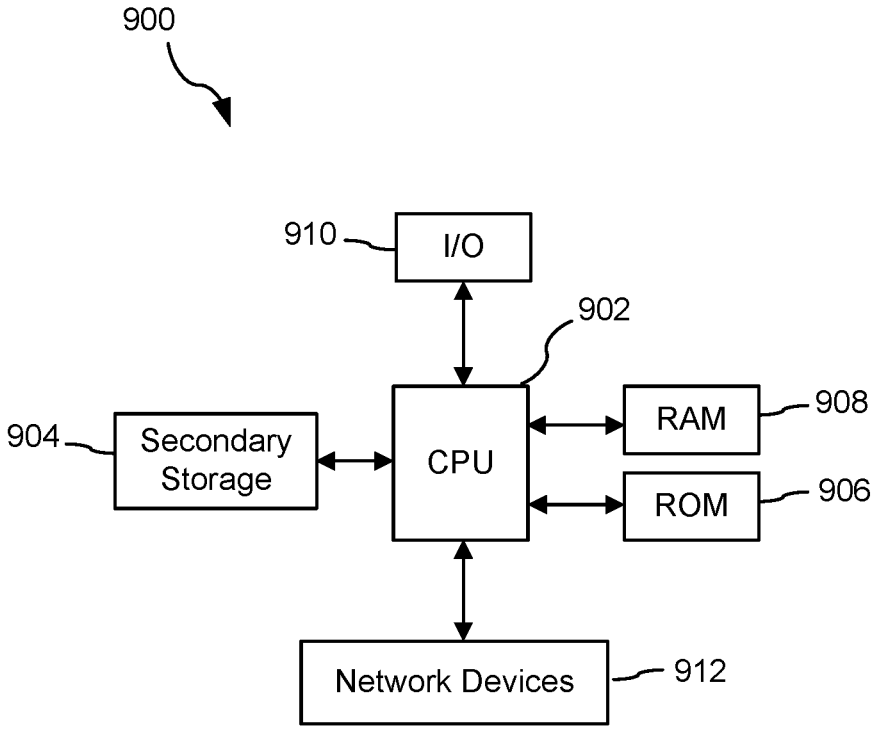
FIG. 9 is a block diagram of a computer system according to an embodiment of the disclosure.

FIG. 9 illustrates a computer system 900 suitable for implementing one or more embodiments disclosed herein. The computer system 900 includes a processor 902 (which may be referred to as a central processor unit (CPU)) that is in communication with memory devices including secondary storage 904, read-only memory (ROM) 906, random-access memory (RAM) 908, input/output (I/O) devices 910, and network connectivity devices 912. The computer system 900 may be UE 102, IP notification server 120, or OTA server 122. The processor 902 may be implemented as one or more CPU chips.

It is understood that by programming and/or loading executable instructions onto the computer system 900, at least one of the CPU 902, the RAM 908, and the ROM 906 are changed, transforming the computer system 900 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application-specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 900 is turned on or booted, the CPU 902 may execute a computer program or application. For example, the CPU 902 may execute software or firmware stored in the ROM 906 or stored in the RAM 908. In some cases, on boot and/or when the application is initiated, the CPU 902 may copy the application or portions of the application from the secondary storage 904 to the RAM 908 or to memory space within the CPU 902 itself, and the CPU 902 may then execute instructions that the application is comprised of. In some cases, the CPU 902 may copy the application or portions of the application from memory accessed via the network connectivity devices 912 or via the I/O devices 910 to the RAM 908 or to memory space within the CPU 902, and the CPU 902 may then execute instructions that the application is comprised of. During execution, an application may load instructions into the CPU 902, for example load some of the instructions of the application into a cache of the CPU 902. In some contexts, an application that is executed may be said to configure the CPU 902 to do something, e.g., to configure the CPU 902 to perform the function or functions promoted by the subject application. When the CPU 902 is configured in this way by the application, the CPU 902 becomes a specific purpose computer or a specific purpose machine.

The secondary storage 904 is typically comprised of one or more disk drives or tape drives and is used for non-volatile storage of data and as an over-flow data storage device if RAM 908 is not large enough to hold all working data. Secondary storage 904 may be used to store programs which are loaded into RAM 908 when such programs are selected for execution. The ROM 906 is used to store instructions and perhaps data which are read during program execution. ROM 906 is a non-volatile memory device which typically has a small memory capacity relative to the larger memory capacity of secondary storage 904. The RAM 908 is used to store volatile data and perhaps to store instruc-tions. Access to both ROM 906 and RAM 908 is typically faster than to secondary storage 904. The secondary storage 904, the RAM 908, and/or the ROM 906 may be referred to in some contexts as computer readable storage media and/or non-transitory computer readable media.

I/O devices 910 may include printers, video monitors, liquid crystal displays (LCDs), touch screen displays, key-boards, keypads, switches, dials, mice, track balls, voice recognizers, card readers, paper tape readers, or other well-known input devices.

The network connectivity devices 912 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectiv-ity devices 912 may provide wired communication links and/or wireless communication links (e.g., a first network connectivity device 912 may provide a wired communica-tion link and a second network connectivity device 912 may provide a wireless communication link). Wired communi-cation links may be provided in accordance with Ethernet (IEEE 802.3), Internet protocol (IP), time division multiplex (TDM), data over cable service interface specification (DOCSIS), wavelength division multiplexing (WDM), and/ or the like. In an embodiment, the radio transceiver cards may provide wireless communication links using protocols such as code division multiple access (CDMA), global system for mobile communications (GSM), long-term evo-lution (LTE), WiFi (IEEE 802.11), Bluetooth, Zigbee, nar-rowband Internet of things (NB IoT), near field communi-cations (NFC) and radio frequency identity (RFID). The radio transceiver cards may promote radio communications using 5G, 5G New Radio, or 5G LTE radio communication protocols. These network connectivity devices 912 may enable the processor 902 to communicate with the Internet or one or more intranets. With such a network connection, it is contemplated that the processor 902 might receive infor-mation from the network, or might output information to the network in the course of performing the above-described method steps. Such information, which is often represented as a sequence of instructions to be executed using processor 902, may be received from and outputted to the network, for example, in the form of a computer data signal embodied in a carrier wave.

Such information, which may include data or instructions to be executed using processor 902 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 902 executes instructions, codes, computer programs, scripts which it accesses from hard disk, floppy disk, optical disk (these various disk based systems may all be considered secondary storage 904), flash drive, ROM 906, RAM 908, or the network connectivity devices 912. While only one processor 902 is shown, multiple processors may be present. Thus, while instructions may be discussed as executed by a processor, the instructions may be executed simultaneously, serially, or otherwise executed by one or multiple processors. Instructions, codes, computer pro-grams, scripts, and/or data that may be accessed from the secondary storage 904, for example, hard drives, floppy disks, optical disks, and/or other device, the ROM 906, and/or the RAM 908 may be referred to in some contexts as non-transitory instructions and/or non-transitory informa-tion.

In an embodiment, the computer system 900 may com-prise two or more computers in communication with each other that collaborate to perform a task. For example, but not by way of limitation, an application may be partitioned in such a way as to permit concurrent and/or parallel process-ing of the instructions of the application. Alternatively, the data processed by the application may be partitioned in such a way as to permit concurrent and/or parallel processing of different portions of a data set by the two or more computers. In an embodiment, virtualization software may be employed by the computer system 900 to provide the functionality of a number of servers that is not directly bound to the number of computers in the computer system 900. For example, virtualization software may provide twenty virtual servers on four physical computers. In an embodiment, the func-tionality disclosed above may be provided by executing the application and/or applications in a cloud computing envi-ronment. Cloud computing may comprise providing com-puting services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may com-prise cloud computing resources owned and operated by the enterprise as well as cloud computing resources hired and/or leased from a third-party provider.

In an embodiment, some or all of the functionality dis-closed above may be provided as a computer program product. The computer program product may comprise one or more computer readable storage medium having com-puter usable program code embodied therein to implement the functionality disclosed above. The computer program product may comprise data structures, executable instructions, and other computer-usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 900, at least portions of the contents of the computer program product to the secondary storage 904, to the ROM 906, to the RAM 908, and/or to other non-volatile memory and volatile memory of the computer system 900. The processor 902 may process the executable instructions and/or data structures in part by directly accessing the computer program product, for example by reading from a CD-ROM disk inserted into a disk drive peripheral of the computer system 900. Alternatively, the processor 902 may process the executable instructions and/or data structures by remotely accessing the computer program product, for example by downloading the executable instructions and/or data structures from a remote server through the network connectivity devices 912. The computer program product may comprise instructions that promote the loading and/or copying of data, data structures, files, and/or executable instructions to the secondary storage 904, to the ROM 906, to the RAM 908, and/or to other non-volatile memory and volatile memory of the computer system 900.

In some contexts, the secondary storage 904, the ROM 906, and the RAM 908 may be referred to as a non-transitory computer readable medium or a computer readable storage media. A dynamic RAM embodiment of the RAM 908, likewise, may be referred to as a non-transitory computer readable medium in that while the dynamic RAM receives electrical power and is operated in accordance with its design, for example during a period of time during which the computer system 900 is turned on and operational, the dynamic RAM stores information that is written to it. Similarly, the processor 902 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication device, comprising:
a subscriber identity module (SIM);
a central processing unit (CPU); and
a non-transitory memory comprising executable instructions that when executed by the CPU, causes the SIM to:
receive an authentication token from an over-the-air (OTA) server, wherein the authentication token comprises identification information that identifies a SIM profile on the SIM;
receive an OTA Internet Protocol (IP) notification from the OTA server via an IP notification server, wherein the OTA IP notification comprises SIM content that includes an encrypted payload;
decrypt the encrypted payload to obtain a decrypted payload, wherein the decrypted payload includes either SIM update data with which to update the SIM or a trigger instruction that directs the SIM to retrieve the SIM update data from the OTA server;
determine whether the decrypted payload includes the trigger instruction and, as a result, either:
retrieve the SIM update data from the OTA server if the SIM determines that the decrypted payload includes the trigger instruction, wherein to retrieve the SIM update data includes:
using the authentication token in a token exchange with the OTA server to identify and authenticate the SIM profile to the OTA server;
sending, to the OTA server, an IP message for obtaining the SIM update data from the OTA server;
receiving the SIM update data from the OTA server; and
updating the SIM with the received SIM update data; or
update the SIM with the SIM update data in the decrypted payload, if the SIM determines that the decrypted payload does not include the trigger instruction.

2. The communication device of claim 1, wherein the trigger instruction includes a Uniform Resource Locator (URL) address or an IP address.

3. The communication device of claim 1, wherein the SIM comprises one or more SIM profiles, and wherein the executable instructions further cause the SIM to:
run a diagnostic operation on the communication device to obtain a diagnostic result; and
determine a data update to the one or more SIM profiles based on the diagnostic result.

4. The communication device of claim 3, wherein the executable instructions further cause the SIM to transmit registration information to the OTA server via the IP notification server.

5. The communication device of claim 4, wherein the registration information comprises instructions for receiving the OTA IP notification for a SIM profile of the one or more SIM profiles on the SIM.

6. The communication device of claim 1, wherein the executable instructions further cause the SIM to transmit an update message to the OTA server that indicates a result of the update to the SIM.

7. An over-the-air (OTA) server, comprising:
a central processing unit (CPU); and a non-transitory memory comprising executable instructions that when executed by the CPU, causes the OTA server to:

receive an authentication token from an Internet Protocol (IP) notification server, wherein the authentication token comprises information to identify a subscriber of a subscriber identity module (SIM) of a communication device during data exchange with the IP notification server, to authenticate a SIM profile on the SIM, and to authorize the SIM to receive OTA IP notifications from the OTA server;

transmit the authentication token to a storage;

refer to the storage to authenticate the SIM profile based on the information in the authentication token received from the IP notification server;

in response to authenticating the SIM profile, send an OTA IP notification to the SIM, wherein the OTA IP notification includes SIM update data with which to update the SIM; and receive an update message from the SIM responsive to sending trigger instruction in the OTA IP notification.

8. The OTA server of claim 7, wherein the executable instructions further cause the OTA server to:

receive, from the SIM, an IP message instructing the OTA server to send the SIM content; or send, to the SIM, the SIM content based on the OTA server determining the SIM content is to be updated.

9. The OTA server of claim 8, wherein the executable instructions further cause the OTA server to receive, from the SIM, an IP message instructing the OTA server to send the SIM update data.

10. The OTA server of claim 9, wherein the trigger instruction includes a Uniform Resource Locator (URL) address or an IP address.

11. A system, comprising:

a communication device comprising a subscriber identity module (SIM); and an over-the-air (OTA) server coupled to the communication device and configured to:

receive an authentication token from an Internet Protocol (IP) notification server, wherein the authentication token comprises information to identify a subscriber of the SIM during data exchange with the IP notification server, to authenticate a SIM profile on the SIM, and to authorize the SIM to receive OTA IP notifications from the OTA server;

transmit the authentication token to a storage;

refer to the storage to authenticate the SIM profile based on the information in the authentication token;

in response to authenticating the SIM profile, send the OTA IP notification to the SIM via the IP notification server, wherein the OTA IP notification includes SIM update data with which to update the SIM, wherein the SIM is configured to:

receive the authentication token and the OTA IP notification from the IP notification server, wherein the OTA IP notification comprises SIM content that includes an encrypted payload;

decrypt the encrypted payload to obtain a decrypted payload, wherein the decrypted payload includes either the SIM update data or a trigger instruction that directs the SIM to retrieve the SIM update data from the OTA server;

determine whether the decrypted payload includes the trigger instruction and, as a result, either:

retrieve the SIM update data from the OTA server if the SIM determines that the decrypted payload includes the trigger instruction, wherein to retrieve the SIM update data includes:

using the authentication token in a token exchange with the OTA server to identify and authenticate the SIM profile to the OTA server;

sending, to the OTA server, an IP message for obtaining the SIM update data from the OTA server;

receiving the SIM update data from the OTA server; and updating the SIM with the received SIM update data; or update the SIM with the SIM update data in the decrypted payload, if the SIM determines that the decrypted payload does not include the trigger instruction.

12. The system of claim 11, wherein the trigger instruction includes a Uniform Resource Locator (URL) address or an IP address.

13. The system of claim 11, wherein the SIM comprises one or more SIM profiles, and wherein the SIM is further configured to:

run a diagnostic operation on the communication device to obtain a diagnostic result; and determine a data update to the one or more SIM profiles based on the diagnostic result.

14. The system of claim 13, wherein the SIM is further configured to transmit registration information to the OTA server via IP messaging for registering the SIM to receive the OTA IP notification.

* * * * *